Jan. 7, 1964 F. F. SLACK 3,117,242

ANALOG MULTIPLIER USING SOLID-STATE ELECTRONIC BRIDGE

Filed Dec. 26, 1961

INVENTOR.
FREDERICK F. SLACK

BY Wade Koontz
ATTORNEY
and
James S. Shannon
AGENT

United States Patent Office 3,117,242

Patented Jan. 7, 1964

3,117,242

ANALOG MULTIPLIER USING SOLID-STATE ELECTRONIC BRIDGE

Frederick F. Slack, 495 Williams St., Stoneham, Mass.

Filed Dec. 26, 1961, Ser. No. 162,300
6 Claims. (Cl. 307—88.5)
(Granted under Title 35, U.S. Code (1952), sec. 266)

Figures 1, 2, 3, 4:
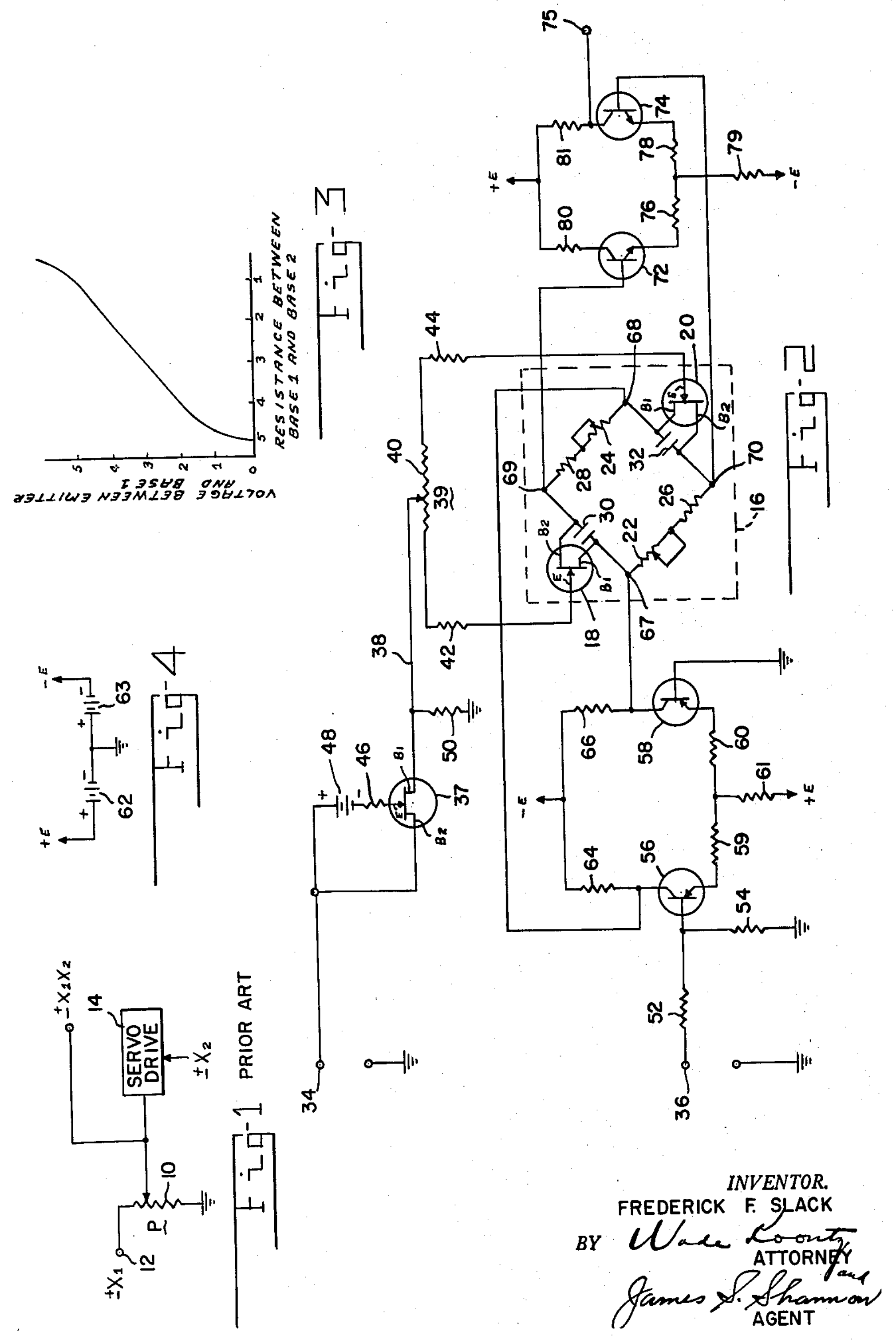
FIG. 1 PRIOR ART, FIG. 2, FIG. 3, FIG. 4

The invention described herein may be manufactured and used by or for the United States Government for governmental purposes without payment to me of any royalty thereon.

The invention relates to electronic multiplier apparatus of the analog type and, particularly, to electronic multiplier apparatus that reliably performs the mathematical process of multiplication in a rapid manner.

Development of electronic computing apparatus for performing computational work has revealed many techniques for improving the methods relied upon previously in data processing operations. Constant search for new devices has led to two general systems of computation in wide use at the present time. The first of these is the digital method in which input data is first converted to numerical quantities such as discrete numbers which are then operated on arithmetically to obtain a solution. A final answer representing the desired operational results is obtained by reconverting the arithmetic quantity to data presentable for introduction to allied parts of the system. Although capable of extreme accuracy, the digital method has the disadvantage of requiring numerical conversions and attention therefore must be paid to programming the quantities on which the computational processes are to be performed.

The second widely adopted method of computation in the analog, which speeds up data processing operations considerably since operations are made directly on quantities without conversion, therefore entirely avoiding the programming requirements basic to digital systems. Analog multiplying apparatus in high speed measuring equipment has been developed in varying degrees of complexity, depending chiefly on the technique used and the requirements of accuracy and speed of the computational operation. One relatively successful and simple method of multiplying analog quantities is the use of the servo-driven potentiometer. In this method, the arm of a potentiometer is positioned according to one variable and a voltage representing a second variable is applied across the potentiometer winding. The voltage appearing on the arm of the potentiometer is proportional to the mathematical product of the supplied variables. Limitations arise, however, through multiplication in this manner since the electromechanical action of the potentiometer is limited in operating speed to several cycles per second. Moreover, the positioning of the arm generally is subject to error due primarily to purely mechanical conditions which introduce certain errors when not corrected. The high degree of accuracy typical of servo-driven potentiometer systems is thus offset by drawbacks in operation resulting from imposed limitations of mechanical movement.

Accordingly, one object of this invention is to provide an improved and novel electronic multiplier of analog signals.

Another object of this invention is the provision of an electronic analog multiplier for more accurately and swiftly providing a variable proportional to the product of two independent quantities capable of fluctuating over a wide frequency range.

Another object of this invention is the provision of electronic analog multiplying apparatus capably utilizing the principles of servo-driven potentiometer multiplication and characterized in that an electronic variable-resistance device varies its resistance as a function of an applied voltage without the requirement of a mechanical motion.

In accordance with the invention, an arrangement for carrying out the aforementioned objects includes a balanced bridge circuit comprising a pair of voltage-responsive variable resistance devices connected in two opposite sides of the bridge, the devices being arranged to unbalance the bridge through variation of their resistance in response to a first electrical analog signal representing a first quantity to be multiplied. The other two corners of the bridge are supplied with a second electrical analog signal representing the second quantity to be multiplied. A third electrical analog signal proportional to the mathematical product of the first and second analog signals is produced at the other two corners of the bridge.

A complete understanding of the invention and an introduction to other objects and features not specifically mentioned may be had from the following detailed description of a specific embodiment thereof when read in connection with the appended drawing, wherein:

FIG. 1 shows a prior art system in schematic form for multiplying two electrical analog quantities;

FIG. 2 diagrammatically illustrates an embodiment of the electronic analog multiplier constructed according to the present invention;

FIG. 3 is a graphic presentation of the voltage-resistance characteristics of a unijunction transistor of the type employed in the electronic analog multiplier shown in FIG. 2; and, FIG. 4 shows a direct current power supply arrangement applicable to the present invention.

Referring now to the drawing, and specifically to FIG. 1, which shows a typical prior art potentiometer multiplying circuit, a linear potentiometer P includes a winding 10 excited by an electrical analog voltage $\pm X_1$ impressed between terminal 12 and ground. The wiper arm of the potentiometer is positioned by a servo-drive 14 excited by a mechanical analog voltage $\pm X_2$. The output voltage on the wiper arm is then proportional to the product of $\pm X_1X_2$ which provides four-quadrant operation depending on the respective polarities of the voltages $X_1$ and $X_2$. As mentioned hereinabove, the setting of the wiper arm requires a finite time which may be undesirable in high speed computer operations, and the setting generally cannot be considered error free, due to the inherent inertia and backlash of the mechanical driving elements.

Referring now to FIG. 2, there is shown one embodiment of an electronic analog multiplier constructed in accordance with the present invention. The nucleus of the embodiment illustrated is a bridge circuit arrangement shown within dashed lines and designated generally by the reference character 16. In a manner which will be shown, the bridge simulates the operation of the potentiometer of prior art multiplying systems and includes a pair of unijunction transistors 18 and 20 connected in two opposite sides of the bridge and arranged to act as voltage controlled variable resistors. Adjustable balancing resistance elements 22 and 24 are connected in the two other sides of the bridge in series with current limiting resistors 26 and 28, respectively.

Each transistor 18 and 20 comprises a P-type emitter electrode designated E and an N-type base electrode having two connections B1 and B2 made to the base portion. Voltage stabilizing condensers 30 and 32 shunt the respective base terminals of transistors 18 and 20, as shown. In the illustrated arrangement of transistors 18 and 20, the resistance of the base portion varies inversely to the voltage applied between the emitter E and terminal B1 of the base. FIG. 3 shows the relationship of the resistance between base terminals B1 and B2 as a function of the voltage between emitter E and base terminal B1, with the ordinate and abscissa being plotted in unit increments for the sake of simplifying the description. Briefly considering the operating characteristics of transistors 18 and 20, with reference being made to FIG. 3, increasing the voltage between emitter E and terminal B1 in a positive direction proportionally lowers the base resistance. Conversely, making the emitter E less positive with respect to base terminal B1 increases the resistance of the base. A desirable feature of unijunction transistors is that the base resistance offered is a function of one input only, that is, it is essentially independent of voltage applied between terminals B1 and B2 of the base.

The electrical analog voltages to be multiplied are applied between input terminals 34 and 36 and ground. An input voltage impressed at terminal 34 is applied to the emitters E of transistors 18 and 20 via a third unijunction transistor 37, a wire 38, the arm of a potentiometer 39 whose winding is referenced 40, and thence over parallel paths extending from one end of winding 40 through a resistor 42 to emitter E of transistor 18, and from the other end of winding 40 through a resistor 44 to emitter E of transistor 20. In the preferred embodiment, resistors 42 and 44 are selected with equal resistances. Assuming for purposes of explanation that a potential representing one of the input variables is applied to input terminal 34, it will be seen that the excitation voltage between the emitter E of transistors 18 and 20 and the base terminal B1 of these devices changes simultaneously. This results in a corresponding directional change in the base resistance of transistors 18 and 20. Control of the base resistance of transistors 18 and 20 is thus achieved in accordance with an electrical analog signal which may either be a unidirectional or a varying quantity so that, depending upon the nature of the input signal at terminal 34, the base resistance of transistors 18 and 20 can reach a fixed level or vary cyclically in time relationship.

Transistor 37 connected between input terminal 34 and the bridge 16 has its emitter E connected to base terminal B2 thereof through a resistor 46 and a battery 48 having polarity designations in the indicated manner. Base terminal B1 of transistor 37 is connected to the arm of potentiometer 39 and is returned to ground through a resistor 50. As seen in FIG. 3, the voltage-resistance curve of the unijunction transistors embodied in the bridge of the present invention is not linear over the entire operating range. Therefore, a correction factor which tends to compensate for the non-linear characteristics of the unijunction transistors employed in the bridge circuit is introduced by the operation of transistor 37.

The invention is also adapted to receive either direct current or alternating current input variables at the other input terminal 36. A voltage applied to terminal 36 is distributed over a voltage divider network comprising resistors 52 and 54. Voltage impressed across resistor 54 is, in turn, applied to a differential amplifier comprising two PNP transistors 56 and 58, each comprising base, emitter and collector electrodes. The base of transistor 56 is connected to the junction of resistors 52 and 54 whereas the base of transistor 58 is connected directly to ground. The emitters of transistors 56 and 58 are returned via resistors 59 and 60, respectively, which are of equal resistance, and further via a resistor 61, to the positive terminal (+E) of a source of direct current, which may be a battery 62, as shown in FIG. 4, having appropriate positive and negative polarity indications and its other or negative terminal (—E) grounded. Connections to the negative terminal (—E) of a battery 63, also shown in FIG. 4, and grounded at its positive terminal (+E), are made to the collectors of transistors 56 and 58, via load resistors 64 and 66, respectively. Resistor 66 may be chosen to have a slightly higher value than resistor 64. By symmetry, the output voltage between the collectors of transistors 56 and 58 is zero at zero input voltage at terminal 36.

The collectors of transistors 56 and 58 are connected to the two opposite corners 67 and 68 of the bridge 16 which are connected with base terminal B1 of transistors 18 and 20, respectively. Thus, for example, assuming that a voltage is applied to input terminal 36 and, hence, to the base of transistor 56, the base of transistor 58 remaining at ground, the output voltage between the collectors of transistors 56 and 58 is "push-pull," thus furnishing inversion of the input voltage at the collector of transistor 56 and a voltage without inversion at the collector of transistor 58. Note, therefore, that the differential amplifier comprising transistors 56 and 58 effectively converts a single-ended input to a double-ended output in a manner well known in the art.

Amplification of any differential quantity existing at the other two corners 69 and 70 of the bridge is obtained by means of a second differential amplifier including two NPN transistors 72 and 74 each comprising base, emitter and collector electrodes. As will be seen below, transistors 72 and 74 provide, at output terminal 75, a single output quantity proportional to the product of input variables applied to terminals 34 and 36. Resistors 76 and 78, which in practical embodiments of the invention would be of equal value, connect the emitters of transistors 72 and 74 to the negative terminal (—E) of battery 63 through an emitter resistor 79 common to both devices. Positive voltage supplied to the collectors of transistors 72 and 74 may be obtained, as shown, from the positive terminal (+E) of battery 62 via respective load resistors 80 and 81.

The operation of the instant invention will now be described. Let us assume that there is zero input voltage at terminal 34. Adjustments are made with potentiometers 22, 24 and 39, such that, regardless of any voltage between points 67 and 68 of the bridge, the voltage drops in the sides of the bridge produce zero voltage across corners 69 and 70 of the bridge, that is, the bridge is balanced and the output is zero. With the bridge balanced, let us assume now that terminal 34 is excited by an input voltage whereas input terminal 36 is not. The voltage at terminal 34 changes the resistance characteristics of transistors 18 and 20 in accordance with the polarity of the voltage thereby unbalancing the bridge. However, due to the criterion previously established, zero output voltage exists between the collectors of transistors 56 and 58 with zero input so that the voltage difference between corners 67 and 68 of the bridge likewise in zero. Under these conditions, zero output voltage results at the other two corners 69 and 70 despite the unbalanced condition. It will thus be apparent that if either of the input voltages is zero while, simultaneously, a voltage is applied to the other input terminal, the output product is zero. Computational standards imposed by ordinary multiplication considerations are thus observed each time either of the two input variables is zero.

In now considering the manner in which the invention achieves multiplication of independent input variables which have a finite value, let it be assumed that one analog voltage to be multiplied excites terminal 34 positive with respect to ground and that another analog voltage considered the second input variable is applied to terminal 36 negative with respect to ground. The voltage at terminal 34 causes a proportionate decrease in the resistance in the sides of the bridge occupied by transistors 18 and 20 thereby unbalancing the bridge in one direction. Applying a negative voltage to the base of transistor 56 increases the reverse bias at the emitter-base junction thereof such that a differential voltage proportional to the voltage exciting terminal 36 is developed between the collectors of transistors 56 and 58, with the collector of transistor 56 swinging positive with respect to the collector of transistor 58. The corner 68 of the bridge is now made positive relative to the opposite corner 67, due to the differential output voltage produced by transistors 56 and 58. It therefore will be seen that an output voltage is developed across the bridge which renders the corner 69 negative with respect to the opposite corner 70. For convenience in illustration, the corner 69 of the bridge is selected as a reference point to which succeeding multiplication processes may be compared in order to establish a consistent pattern showing the manner in which four-quadrant multiplication is achieved by the invention. The bridge output voltage developed between corners 69 and 70 is applied to the bases of transistors 72 and 74. Conduction in transistor 72 decreases causing an opposite effect on conduction in transistor 74. The net result at the collector of transistor 74 is a voltage negative with respect to ground and commensurate to the product of the input analog voltages applied to terminals 34 and 36.

In the second illustrative example, assume that an input analog voltage negative with respect to ground is applied to input terminal 34, and that a second input analog voltage positive with respect to ground is applied to excite terminal 36. Due to the voltage at terminal 34, a corresponding increase in the base resistance of transistors 18 and 20 occurs to unbalance the bridge in the opposite direction. The voltage at terminal 36 produces a differential voltage at the collectors of transistors 56 and 58 with the collectors thereof swinging negative and positive, respectively, in a manner believed to require no further explanation. With corner 67 of the bridge now made positive with respect to the opposite corner 68, accompanied by an increase in the base resistance of transistors 18 and 20, a voltage is developed across the output terminals of the bridge with corner 69 again becoming negative with respect to the opposite corner 70. It may be seen that reversing the polarity of the respective voltages impressed at terminals 34 and 36 nonetheless produces an analog product voltage having the proper polarity required by the mathematical operation. The manner in which the transistors 72 and 74 develop a single product voltage at output terminal 75 which is negative with respect to ground is believed clear without further elaboration.

The multiplier circuit embodying the present invention has the characteristic of providing a positive product voltage output when the inputs to terminals 34 and 36 are either both positive or negative. Thus, in the third case, if incoming analog voltages cause both terminals 34 and 36 to go positive with respect to ground, the roles of transistors 56 and 58 will be such that the differential voltage generated between their collectors has a direction which makes corner 67 of the bridge positive with respect to the opposite corner 68. Due to the voltage applied to terminal 34, the base resistance of transistors 18 and 20 decreases. From an analysis of voltage conditions in the bridge under these circumstances, it may be seen that a differential product voltage, corner 69 positive with respect to corner 70, is fed to transistors 72 and 74. Through the operation of transistors 72 and 74, output terminal 75 displays a product voltage positive with respect to ground which may be seen to be in mathematical agreement with the signs of the input variables.

As the final illustration, if both input voltages are negative with respect to ground, the bridge becomes unbalanced in a direction opposite to that when both input voltages are positive. However, because the polarity of the voltage appearing across corners 67 and 68 of the bridge likewise is reversed, a product voltage establishing corner 69 positive with respect to corner 70 is applied to transistors 72 and 74. The operation of converting the bridge output voltage to a single-ended product quantity is again completed by transistors 72 and 74.

At this point it will be apparent that the invention as described is applicable to receiving both direct current and alternating current analog variables and that either or both of the input variables may be made either positive or negative continuously or in cyclic fashion, and that a correct multiplication will occur, with the instantaneous sign of the product variable being appropriately consistent with the respective signs of both input variables through all four quadrants of operation.

In a practical working embodiment testing the illustrated invention, satisfactory results were obtained over a frequency range from direct current to forty kilocycles per second with errors limited to less than 0.75 percent of full scale. For optimum results, primarily with regard to improving the accuracy of the final product quantity obtained, transistors 18 and 20 should have identical electrical characteristics. Similarly, the characteristics of the respective pairs of transistors 56, 58 and 72, 74 should be matched electrically. The following transistor components were used in a successfully tested working embodiment: unijunction transistors 18, 20 and 37, type 2N49E; PNP transistors 56 and 58, type 2N508; and NPN transistors 72 and 74, type 2N169A. It is pointed out, however, that while the unijunction transistors shown herein have been adopted for use in the bridge circuit because of their substantially linear qualities when excited by emitter voltages, it will be obvious to those skilled in the art that numerous other voltage-sensitive variable-gain solid state devices could effectively be substituted for the unijunction transistors, and that the use of unijunction transistors in the bridge circuit shown in FIG. 2 is merely an illustrative example of the invention and should not be construed as a limitation thereof.

Further, although only one embodiment of the invention has been illustrated and described, it will equally be apparent to those skilled in the art that other changes and modifications may be made therein without departing from the spirit of the invention or the scope of the appended claims.

What I claim is:

1. Electronic analog multiplying apparatus comprising, two voltage-responsive devices each having a control electrode and a bi-terminal variable impedance element whose impedance varies as a function of the voltage between the control electrode and a predetermined one of the terminals of said element, said devices having the variable impedance elements thereof connected in two opposite sides of a bridge arrangement in such manner that signals of like polarity applied concurrently to said control electrodes vary the impedance of said devices in the same direction, means for balancing said bridge connected in the other two sides of said bridge, a first input source connected to said control electrodes for unbalancing said bridge by an amount proportional to a first quantity to be multiplied, a second input source supplying signal values proportion to a second quantity to be multiplied, means connected between said second input source and two opposite corners of said bridge for converting each second quantity signal to a push-pull analog quantity, and output circuit means connected to the two other corners of said bridge for generating a third quantity proportional to the product of said first and second quantities.

2. Electronic analog multiplying apparatus according to claim 1 in which said output circuit means comprises a differential amplifier into which the bridge output signal appearing at said two other corners of said bridge is introduced, said differential amplifier converting its input signal to a single final output signal proportional to the product of said first and second quantities.

3. Electronic analog multiplying apparatus comprising, two voltage-responsive devices each having a control electrode and a bi-terminal base element whose resistance varies as a function of the voltage between the control electrode and a predetermined one of the base terminals, the base elements of said devices being connected in two opposite sides of a bridge circuit in such manner that the resistance in the sides of the bridge containing said devices changes by equal amounts and in the same direction when signals of like polarity are applied concurrently to said control electrodes, means connected in the other two sides of said bridge for balancing it, first input means connected to said control electrodes for unbalancing said bridge in proportion to a first variable representing one quantity to be multiplied, second input means for applying between two opposite corners of said bridge a second variable representing a second quantity to be multiplied, and means connected to the two other corners of said bridge for generating a potential porportional to the product of said first and second variables.

4. Electronic analog multiplying apparatus for providing an output potential proportional to the product of two input variables comprising, a pair of unijunction transistors each having emitter and base electrodes, said transistors being connected in two opposite sides of a bridge arrangement and being so arranged as to vary base resistances equally in the same direction when potentials of like polarity are concurrently applied to said emitter electrodes, adjustable means connected in the other two sides of the bridge for balancing said bridge, first signal means for changing concurrently the emitter-base voltage said transistors to unbalance said bridge in accordance with a first independent variable to be multiplied, second signal means for applying to two opposite corners of said bridge a voltage proportional to a second independent variable to be multiplied, and output circuit means connected to the two other corners of said bridge for generating a dependent variable proportional to the product of said first and second independent variables.

5. Electronic analog multiplying apparatus for providing an output voltage corresponding to the product of two independent variables comprising, a pair of unijunction transistor each having emitter and base elements, the base elements of said transistors forming two opposite sides of an electrical bridge and being arranged to vary their respective resistances equally in the same direction when signals of like sign are applied simultaneously to said emitters, adjustable balancing resistors forming the other two sides of said bridge, first source means coupled to said emitters for changing the base resistance of said transistors equally in the same direction in proportion to a voltage representing a first variable to be multiplied, a first differential amplifier having an input circuit and two output terminals connected to apply push-pull signals to two opposite corners of said bridge, second source means for applying to the input circuit of said first differential amplifier a voltage representing a second variable to be multiplied, whereby said two opposite corner of the bridge are energized by a voltage commensurate to said second variable, and a second differential amplifier connected to the remaining two corners of the bridge and being arranged to convert voltages between said two remaining corners to an output representing the product of said first and second variables.

6. The combination of elements as in claim 5 wherein the emitter electrodes of both of said transistors are connected to said first source means through one of said adjustable balancing resistors and a third unijunction transistor also having emitter and base elements, said third transistor being arranged in the input lead to the emitter elements of the two bridge transistors in such manner as to compensate for non-linear operation of the bridge caused by non-linear characteristics of said bridge transistors.

References Cited in the file of this patent

UNITED STATES PATENTS

| | | |
|---|---|---|
| 3,021,074 | Groenendyke | Feb. 13, 1962 |
| 3,070,309 | Fluegel | Dec. 25, 1962 |